United States Patent
Choi et al.

(10) Patent No.: US 10,097,250 B2
(45) Date of Patent: Oct. 9, 2018

(54) METHOD FOR TRANSMITTING A PPDU IN A TRANSMISSION BANDWIDTH AND DEVICE FOR SAME

(71) Applicant: LG ELECTRONICS INC., Seoul (KR)

(72) Inventors: Jinsoo Choi, Seoul (KR); Jinyoung Chun, Seoul (KR); Wookbong Lee, Seoul (KR); Dongguk Lim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 47 days.

(21) Appl. No.: 15/302,924

(22) PCT Filed: Mar. 24, 2015

(86) PCT No.: PCT/KR2015/002871
§ 371 (c)(1),
(2) Date: Oct. 7, 2016

(87) PCT Pub. No.: WO2015/156520
PCT Pub. Date: Oct. 15, 2015

(65) Prior Publication Data
US 2017/0041050 A1 Feb. 9, 2017

Related U.S. Application Data

(60) Provisional application No. 61/977,103, filed on Apr. 9, 2014, provisional application No. 61/977,599, filed on Apr. 9, 2014.

(51) Int. Cl.
*H04B 7/0452* (2017.01)
*H04L 27/26* (2006.01)
(Continued)

(52) U.S. Cl.
CPC .......... *H04B 7/0452* (2013.01); *H04L 5/005* (2013.01); *H04L 27/26* (2013.01); *H04B 1/02* (2013.01); *H04L 69/323* (2013.01); *H04W 84/12* (2013.01)

(58) Field of Classification Search
CPC ......... H04B 7/0452; H04B 1/02; H04L 5/005; H04L 27/26; H04L 69/323; H04W 84/12
See application file for complete search history.

(56) References Cited

U.S. PATENT DOCUMENTS

2007/0268975 A1   11/2007  Yoon et al.
2008/0205351 A1*  8/2008  Lindoff ............... H04L 27/0008
                                                        370/336

(Continued)

FOREIGN PATENT DOCUMENTS

KR      1020080108566      12/2008
KR      1020120095434      8/2012

OTHER PUBLICATIONS

European Patent Office Application Serial No. 15776910.0, Search Report dated Oct. 20, 2017, 7 pages.

(Continued)

*Primary Examiner* — Christopher Crutchfield
*Assistant Examiner* — Tito Pham
(74) *Attorney, Agent, or Firm* — Lee, Hong, Degerman, Kang & Waimey

(57) ABSTRACT

Provided are a method for transmitting data and a device using the same in a wireless LAN. A transmitter transmits a physical layer protocol data unit (PPDU) in a transmission bandwidth. The PPDU includes a first part to which a first fast Fourier transform (FFT) size is applied, and a second part to which a second FFT size is applied. The number of pilots of the second part is identical to the number of pilots of the first part, and the pilot frequency location of the (Continued)

Pilot allocation at first part (64FFT in 20 MHz)

Pilot allocation at second part (128FFT in 20 MHz)

second part is identical to the pilot frequency location of the first part.

16 Claims, 14 Drawing Sheets

(51) Int. Cl.
 *H04L 5/00* (2006.01)
 *H04B 1/02* (2006.01)
 *H04L 29/08* (2006.01)
 *H04W 84/12* (2009.01)

(56) References Cited

U.S. PATENT DOCUMENTS

| | | | |
|---|---|---|---|
| 2009/0245169 A1* | 10/2009 | Zhang | H04L 1/0026 370/328 |
| 2012/0163505 A1* | 6/2012 | Son | H04L 27/0012 375/329 |
| 2012/0230448 A1* | 9/2012 | Kang | H03M 13/6527 375/295 |
| 2012/0269124 A1 | 10/2012 | Porat | |
| 2012/0281774 A1 | 11/2012 | Lee et al. | |
| 2012/0314696 A1 | 12/2012 | Liu | |
| 2013/0107912 A1 | 5/2013 | Ponnampalam | |
| 2013/0128807 A1* | 5/2013 | Vermani | H04L 5/0053 370/328 |
| 2013/0235860 A1 | 9/2013 | Vermani et al. | |

OTHER PUBLICATIONS

Stacey, R. et al., "Proposed TGac Draft Amendment", IEEE P802.11 Wireless LANs, doc.: IEEE 802.11-10/1361r3, Jan. 2011, 154 pages.

* cited by examiner

METHOD FOR TRANSMITTING A PPDU IN A TRANSMISSION BANDWIDTH AND DEVICE FOR SAME

CROSS-REFERENCE TO RELATED APPLICATIONS

This application is the National Stage filing under 35 U.S.C. 371 of International Application No. PCT/KR2015/002871, filed on Mar. 24, 2015, which claims the benefit of U.S. Provisional Application No. 61/977,103, filed on Apr. 9, 2014 and 61/977,599, filed on Apr. 9, 2014, the contents of which are all hereby incorporated by reference herein in their entirety.

BACKGROUND OF THE INVENTION

Field of the Invention

The present invention relates to wireless communication and, most particularly, to a method for transmitting data in a wireless LAN and a device using the same.

Related Art

Wi-Fi refers to a WLAN (Wireless local area network) technology that allows a wireless device to be connected to the Internet in a 2.4 GHz, 5 GHz, or 60 GHz frequency band. WLAN is based on an IEEE (Institute of Electrical and Electronics Engineers) 802.11 standard (or specification).

The IEEE 802.11n specification supports multi-antenna and provides a maximum data rate of 600 Mbit/s. A system that supports IEEE 802.11n is referred to as a HT (High Throughput) system.

The IEEE 802.11ac specification mostly operates in a 5 GHz band and provides a data rate of 1 Gbit/s or more. IEEE 802.11ac supports DL MU-MIMO (downlink multi-user multiple input multiple output). And, a system supporting IEEE 802.11ac is referred to as a VHT (Very High Throughput) system.

IEEE 802.11ax is being developed as a next generation WLAN in order to prepare for a higher data rate and a higher user load. The scope of the IEEE 802.11ax may include 1) an enhancement of the 802.11 PHY (physical) layer and the MAC (medium access control) layer, 2) an enhancement in a spectrum efficiency and area throughput, and 3) an enhancement in the system performance in an environment having a source of interference existing therein, a dense heterogeneous network environment, an environment having a high user load existing therein, and so on.

The legacy IEEE 802.11 specification (or standard) supports OFDM (orthogonal frequency division multiplexing) and uses only one FFT (fast Fourier transform) size in the same bandwidth. However, the next generation WLAN considers supporting OFDMA (orthogonal frequency division multiple access), wherein multiple user access is available, and using a larger FFT size.

SUMMARY OF THE INVENTION

Technical Objects

The present invention provides a method for transmitting data and a device using the same.

Technical Solutions

In an aspect, a method for transmitting a frame in a wireless LAN includes generating a PPDU (Physical layer Protocol Data Unit) by a transmitter, and transmitting the PPDU from a transmission bandwidth to a receiver by the transmitter. The PPDU includes a first part having a first FFT (fast Fourier transform) size applied thereto and a second part having a second FFT size applied thereto, and a number of pilots of the second part is equal to a number of pilots of the first part, and a pilot frequency position of the second part is the same as a pilot frequency position of the first part.

The second FFT size corresponds to an integer multiple of the first FFT size.

In another aspect, a device for a wireless LAN includes a RF (radio frequency) unit transmitting and receiving radio signals, and a processor being connected to the RF unit. The processor generates a PPDU (Physical layer Protocol Data Unit) and transmits the PPDU from a transmission bandwidth to a receiver through the RF unit. The PPDU includes a first part having a first FFT (fast Fourier transform) size applied thereto and a second part having a second FFT size applied thereto, and a number of pilots of the second part is equal to a number of pilots of the first part, and a pilot frequency position of the second part is the same as a pilot frequency position of the first part.

Effects of the Invention

When different FFTs are applied within a data block, the same channel tracking is possible, and an increase in the level of complexity may be prevented.

DESCRIPTION OF EXEMPLARY EMBODIMENTS

In order to clarify the description, a WLAN (wireless local area network) system following the IEEE (Institute of Electrical and Electronics Engineers) 802.11n specification will be referred to as a HT (High Throughput) system, and a system following the IEEE 802.11ac specification will be referred to as a VHT (Very High Throughput) system. Conversely, a WLAN system following the proposed method will be referred to as a HEW (High Efficiency WLAN) system or a HE (High Efficiency) system. The term HEW or HE is used to merely differentiate the system from the conventional WLAN, and, therefore, such terms will not limit the present invention.

The proposed WLAN system may operate in a 6 GHz band or lower or in a 60 GHz band. And, herein, the band that is equal to or lower than 6 GHz may include at least one of the 2.4 GHz band and the 5 GHz band.

A STA (station) may also be referred to as diverse terms, such as wireless device, MS (mobile station), network interface device, wireless interface device, and so on. Unless the STA separately differentiates its functions with an AP (access point), the STA may include a non-AP STA or an AP. When the communication is referred to as a STA-to-AP communication, the STA may be interpreted as a non-AP STA. When the communication is referred to as a STA-to-STA communication, or if an AP function is not separately required, the STA may correspond to a non-AP STA or an AP.

A PPDU (Physical layer Protocol Data Unit) corresponds to a data block that is generated in a PHY (physical) layer following the IEEE 802.11 specification.

Figure 1:
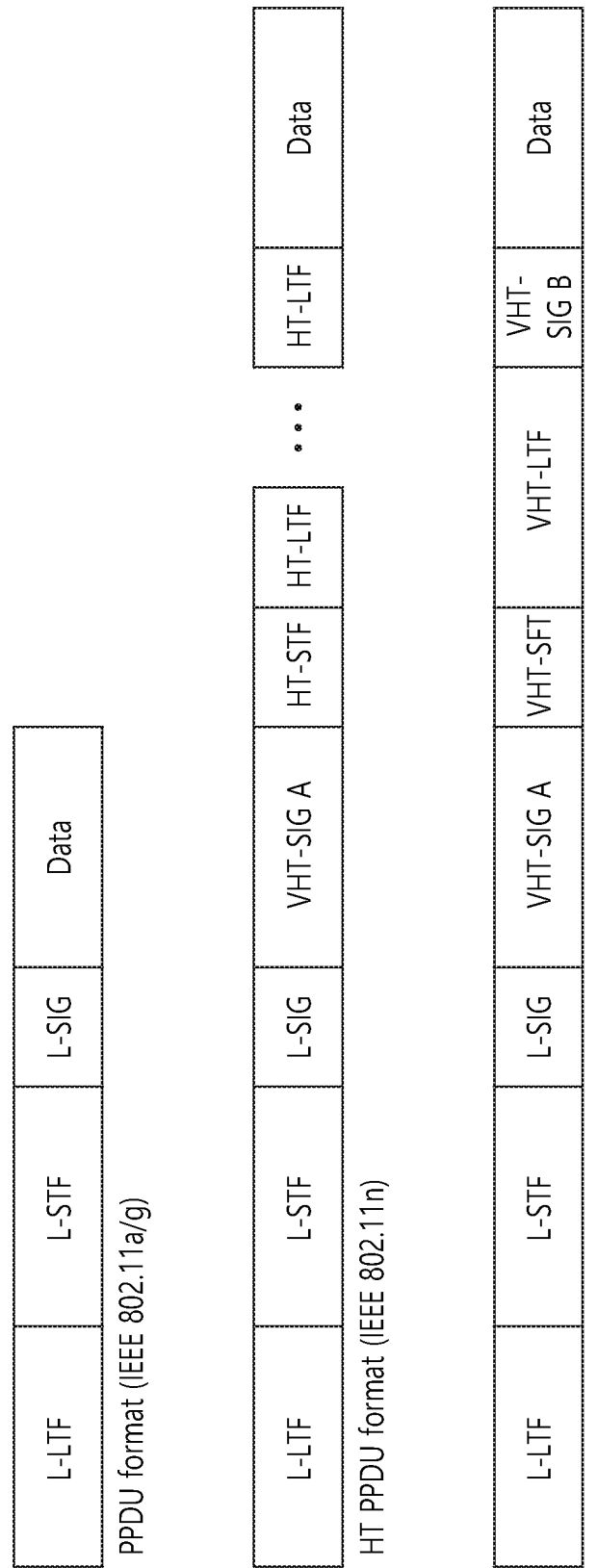
FIG. 1 illustrates a related art PPDU format.

FIG. 1 illustrates a related art PPDU format.

The PPDU supporting IEEE 802.11a/g includes a L-STF (legacy-short training field), a L-LTF (legacy-long training field), and a L-SIG (legacy-signal). The L-STF may be used for frame detection, AGC (automatic gain control), and so on. The L-LTF may be used for fine frequency/time synchronization and channel estimation.

The HT PPDU supporting IEEE 802.11n includes a HT-SIG, a HT-STF, and a HT-LTF after the L-SIG.

The VHT PPDU supporting IEEE 802.11ac includes a VHT-SIGA, a VHT-STF, a VHT-LTF, and a VHT-SIGB after the L-SIG.

Figure 2:
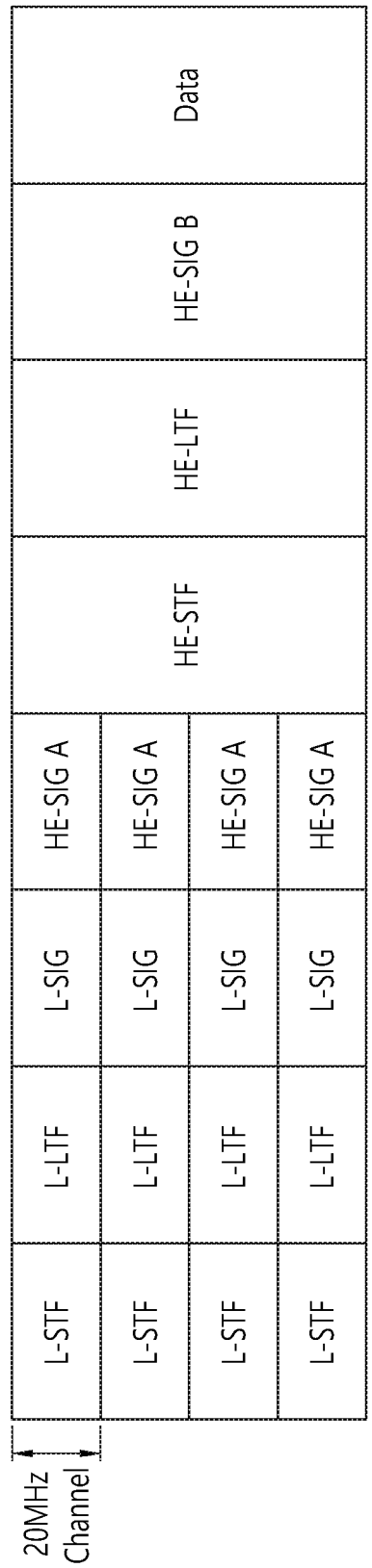
FIG. 2 illustrates an example of a proposed PPDU format for WLAN.

FIG. 2 illustrates an example of a proposed PPDU format for WLAN.

This shows a PPDU that is being transmitted from a total bandwidth of 80 MHz through four (4) 20 MHz channels. The PPDU may be transmitted through at least one 20 MHz channel. An example wherein an 80 MHz band is allocated to one receiving STA is shown herein. Each of the 20 MHz channels may be allocated to different receiving STAs.

The L-STF, the L-LTF, and the L-SIG may be identical to the L-STF, the L-LTF, and the L-SIG of the VHT PPDU. The L-STF, the L-LTF, and the L-SIG may be transmitted from an OFDM (orthogonal frequency division multiplexing) symbol, which is generated based on a size of 64 FFT (fast Fourier transform) (or 64 subcarriers), in each 20 MHz channel.

The HE-SIGA may include common control information, which is commonly received by the STA receiving the PPDU. The HE-SIGA may be transmitted from two (2) or three (3) OFDM symbols.

The following table shows an example of the information included in the HE-SIGA. The field names and the number of bits are merely exemplary, and, therefore, not all of the fields are required to be included.

TABLE 1

| | Bits | Description |
|---|---|---|
| Bandwidth | 2 | This indicates the bandwidth transmitting the PPDU. For example, 20 MHz, 40 MHz, 80 MHz, or 160 MHz. |
| Group ID | 6 | This indicates the STA or the STA group that is to receive the PPDU. |
| Stream Information | 12 | This indicates a number of spatial streams or positions of the spatial streams that are to be received by the STA. Or, this indicates a number of spatial streams or positions of the spatial streams that are to be received by each STA of the STA group. |
| UL(Uplink) Indication | 1 | This indicates whether the PPDU is for the AP (UPLINK) or for the STA (DOWNLINK). |
| MU Indication | 1 | This indicates whether the PPDU corresponds to a SU-MIMO PPDU or a MU-MIMO PPDU. |
| GI(Guard Interval) Indication | 1 | This indicates whether a Short GI or a Long GI is being used. |
| Allocation Information | 12 | Band or channel (sub-channel index or sub-band index) being allocated to each STA from the bandwidth transmitting the PPDU. |
| Transmission Power | 12 | Transmission power for each of the allocated channels |

The HE-STF may be used for enhancing the AGC estimation in the MIMO transmission. The HE-LTF may be used for estimating the MIMO channel.

The HE-SIGB may include user specific information that is required by each STA in order to receive its own data (i.e., PSDU (physical layer service data unit)). The HE-SIGB may be transmitted from one (1) symbol or two (2) symbols. For example, the HE-SIGB may include information related to the length of the corresponding PSDU, and information related to the MCS (Modulation and Coding Scheme) of the.

The L-STF, the L-LTF, the L-SIG, and the HE-SIGA may be duplicately transmitted in 20 MHz channel units. More specifically, when the PPDU is being transmitted through four (4) 20 MHz channels, the L-STF, the L-LTF, the L-STG, and the HE-SIGA may be duplicately transmitted from each 20 MHz channel.

Starting from the HE-STF (or after the HE-SIGA), the FFT size per unit frequency may be further increased. For example, 256 FFT may be used in a 20 MHz channel, 512 FFT may be used in a 40 MHz channel, and 1024 FFT may be used in an 80 MHz channel. If the FFT size is increased, the OFDM subcarrier spacing is reduced. And, accordingly, the number of OFDM subcarriers per unit frequency may be increased, whereas the OFDM symbol time may be increased. In order to increase efficiency, the GI length after the HE-STF may be set to have the same length as the GI length of the HE-SIGA.

Figure 3:
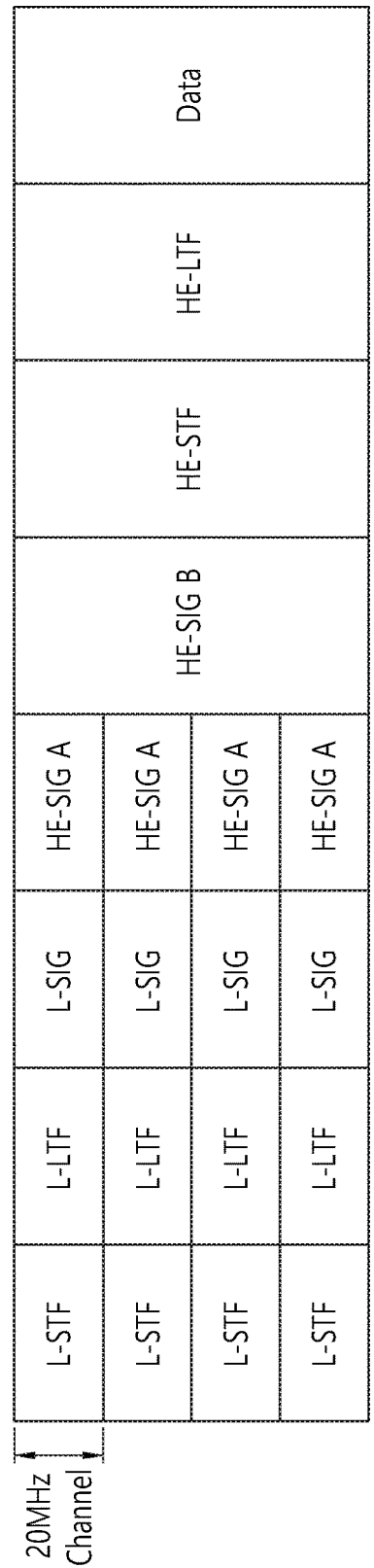
FIG. 3 illustrates another example of a proposed PPDU format for WLAN

FIG. 3 illustrates another example of a proposed PPDU format for WLAN

Apart from the fact that the HE-SIGB is positioned after the HE-SIGA, the PPDU format proposed herein is identical to the PPDU format of FIG. 2. Starting from the HE-STF (or after the HE-SIGB), the FFT size per unit frequency may be further increased.

Figure 4:
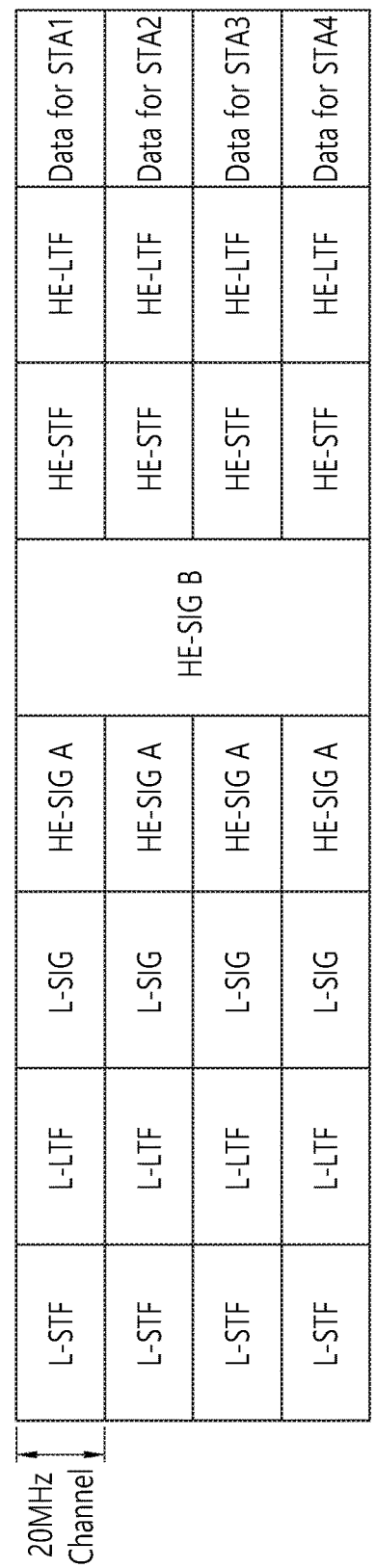
FIG. 4 illustrates yet another example of a proposed PPDU format for WLAN

FIG. 4 illustrates yet another example of a proposed PPDU format for WLAN

The HE-SIGB is positioned after the HE-SIGA. Each 20 MHz channel is allocated to a different STA (STA1, STA2, STA3, and STA4). Although the HE-SIGB includes information that is specified to each of the STAs, the HE-SIGB is encoded throughout the entire band. More specifically, HE-SIGB may be received by all of the STAs. Starting from the HE-STF (or after the HE-SIGB), the FFT size per unit frequency may be further increased.

Meanwhile, if the FFT size is increased, a legacy STA supporting the conventional IEEE 802.11a/g/n/ac cannot decode the corresponding PPDU. In order to allow the co-existence of the legacy STA and the HE STA, the L-STF, the L-LTF, and the L-SIG are transmitted through 64 FFT in the 20 MHz channel, so as to be received by the conventional STA. For example, the L-SIG occupies one OFDM symbol, and one OFDM symbol time corresponds to 4 us, and the GI corresponds to 0.8 us.

Although the HE-SIGA includes information that is required by the HE STA for decoding the HE PPDU, the HE-SIGA may be transmitted through 64 FFT in a 20 MHz channel, so that the HE-SIGA can be received by both the legacy STA and the HE STA. This is to allow the HE STA to receive not only the HE PPDU but also the conventional HT/VHT PPDU. At this point, it will be required for the legacy STA and the HE STA to be capable of differentiating the HE PPDU and the HTNHT PPDU from one another.

Figure 5:
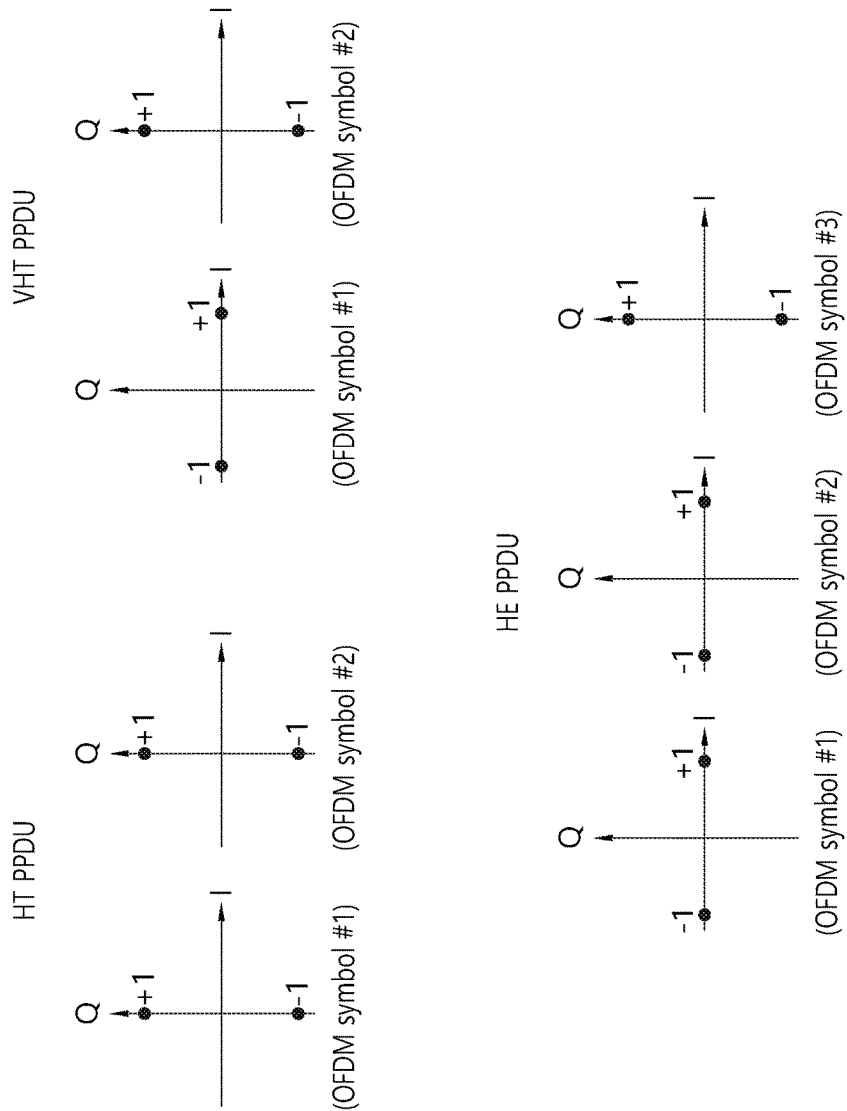
FIG. 5 illustrates an example of phase rotation for differentiating PPDUs.

FIG. 5 illustrates an example of phase rotation for differentiating PPDUs.

For the differentiation of the PPDU, a phase of the constellation respective to the OFDM symbols being transmitted after the L-STF, the L-LTF, and the L-SIG is used.

OFDM Symbol #1 corresponds to a first OFDM symbol after the L-SIG, OFDM Symbol #2 corresponds to an OFDM symbol subsequent to OFDM Symbol #1, and OFDM Symbol #3 corresponds to an OFDM symbol subsequent to OFDM Symbol #2.

In a non-HT PPDU, the constellation phases being used in the 1st OFDM symbol and the 2nd OFDM symbol are identical to one another. BPSK (binary phase shift keying) is used in both of the 1st OFDM symbol and the 2nd OFDM symbol.

In a HT PPDU, the constellation phased being used in OFDM Symbol #1 and OFDM Symbol #2 are identical to one another and are rotated by 90 degrees (90°) counter-clockwise. The modulation method having a constellation that is rotated by 90° is referred to as QBPSK (quadrature binary phase shift keying).

In a VHT PPDU, although the phase of OFDM Symbol #1 is not rotated, the phase of OFDM Symbol #2 is rotated by 90° counter-clockwise just as in the HT PPDU. The VHT-SIGA is transmitted after the L-SIG, and since the VHT-SIGA is transmitted from two (2) OFDM symbols, OFDM Symbol #1 and OFDM Symbol #2 are used for the transmission of the VHT-SIGA.

For the differentiation of the HTNHT PPDU, in the HE-PPDU, the phase of three (3) OFDM symbols that are being transmitted after the L-SIG may be used. Although the phases OFDM Symbol #1 and OFDM Symbol #2 are not rotated, the phase of OFDM Symbol #3 is rotated by 90° counter-clockwise. OFDM Symbols #1 and #2 use BPSK modulation, and OFDM Symbol #3 uses QBPSK modulation.

The HE-SIGA is transmitted after the L-SIG, and if the HE-SIGA is transmitted from three (3) OFDM symbols, it may be said that OFDM Symbols #1/#2/#3 are all used for the transmission of the HE-SIGA.

In the conventional VHT system, a pilot subcarrier is configured by using the method described below.

First of all, in the 20 MHz transmission, four (4) pilot tones may be inserted in subcarrier indexes $k \in \{-21, -7, 7, 21\}$. $P_n^k$, which indicates pilot mapping of a $k^{th}$ subcarrier in an $n^{th}$ symbol, may be expressed by using the Equation shown below.

$$P_n^{\{-21, -7, 7, 21\}} = \{\Psi_{1, n \bmod 4}^{(1)}, \Psi_{1, (n+1) \bmod 4}^{(1)}, \Psi_{1, (n+2) \bmod 4}^{(1)}, \Psi_{1, (n+3) \bmod 4}^{(1)}\}$$

$$P_n^{k \notin \{-21, -7, 7, 21\}} = 0 \quad \text{[Equation 1]}$$

Herein, a pilot parameter $\Psi^{(1)}_{l,m}$ may be defined as shown below in the following table

TABLE 2

| $\psi_{1,0}^{(1)}$ | $\psi_{1,1}^{(1)}$ | $\psi_{1,2}^{(1)}$ | $\psi_{1,3}^{(1)}$ |
|---|---|---|---|
| 1 | 1 | 1 | −1 |

In the 40 MHz transmission, six (6) pilot tones may be inserted in subcarrier indexes $k \in \{-53, -25, -11, 11, 25, 53\}$. $P_n^k$, which indicates pilot mapping of a $k^{th}$ subcarrier in an $n^{th}$ symbol, may be expressed by using the Equation shown below.

$$P_n^{\{-53, -25, -11, 11, 25, 53\}} \{\Psi_{1, n \bmod 6}^{(1)}; \Psi_{1, (n+1) \bmod 6}^{(1)}; \ldots; \Psi_{1, (n+5) \bmod 6}^{(1)}\}$$

$$P_n^{k \notin \{-53, -25, -11, 11, 25, 53\}} = 0 \quad \text{[Equation 2]}$$

Herein, $\Psi^{(1)}_{l,m}$ may be defined as shown below in the following table.

TABLE 3

| $\psi_{1,0}^{(1)}$ | $\psi_{1,1}^{(1)}$ | $\psi_{1,2}^{(1)}$ | $\psi_{1,3}^{(1)}$ | $\psi_{1,4}^{(1)}$ | $\psi_{1,5}^{(1)}$ |
|---|---|---|---|---|---|
| 1 | 1 | 1 | −1 | −1 | 1 |

In the 80 MHz transmission, eight (8) pilot tones may be inserted in subcarrier indexes $k \in \{-103, -75, -39, -11, 11, 39, 75, 103\}$. $P_n^k$, which indicates pilot mapping of a $k^{th}$ subcarrier in an $n^{th}$ symbol, may be expressed by using the Equation shown below.

$$P_n^{\{-103, -75, -39, -11, 11, 39, 75, 103\}} = \{\Psi_{1, n \bmod 8}, \Psi_{1, (n+1) \bmod 8}, \ldots, \Psi_{1, (n+7) \bmod 8}\}$$

$$P_n^{k \notin \{-103, -75, -39, -11, 11, 39, 75, 103\}} = 0 \quad \text{[Equation 3]}$$

Herein, $\Psi_m$ may be defined as shown below in the following table.

TABLE 4

| $\Psi_0$ | $\Psi_1$ | $\Psi_2$ | $\Psi_3$ | $\Psi_4$ | $\Psi_5$ | $\Psi_6$ | $\Psi_7$ |
|---|---|---|---|---|---|---|---|
| 1 | 1 | 1 | −1 | −1 | 1 | 1 | 1 |

For the 160 MHz transmission, the 80 MHz pilot mapping is duplicated to two (20) 80 MHz sub-channels for the 160 MHz transmission. Sixteen (16) pilot tones may be inserted in subcarrier indexes $k \in \{-231, -203, -167, -139, -117,$ −89, −53, −25, 25, 53, 89, 117, 139, 167, 203, 231}. $P_n^k$, which indicates pilot mapping of a $k^{th}$ subcarrier in an $n^{th}$ symbol, may be expressed by using the Equation shown below.

$$P_n\{-231, -203, -167, -139, -117, -89, -53, -25, 25, 53, 89, 117,$$
$$139, 167, 203, 231\} =$$
$$\{\Psi_{n \bmod 8}, \Psi_{(n+1) \bmod 8}, \Psi_{(n+2) \bmod 8},$$
$$\Psi_{(n+3) \bmod 8}, \Psi_{(n+4) \bmod 8}, \Psi_{(n+5) \bmod 8},$$
$$\Psi_{(n+6) \bmod 8}, \Psi_{(n+7) \bmod 8}, \Psi_{n \bmod 8},$$
$$\Psi_{(n+1) \bmod 8}, \Psi_{(n+2) \bmod 8}, \Psi_{(n+3) \bmod 8},$$
$$\Psi_{(n+4) \bmod 8}, \Psi_{(n+5) \bmod 8}, \Psi_{(n+6) \bmod 8},$$
$$\Psi_{(n+7) \bmod 8}\}$$

$$P_n^k \notin \{-231, -203, -167, -139, -117, -89, -53, -25, 25, 53, 89,$$
$$117, 139, 167, 203, 231\} = 0 \qquad \text{[Equation 4]}$$

The pilot parameter $\Psi_m$ for the 160 MHz transmission may be defined as shown in Table 4 just as in the 80 MHz transmission.

A pilot transmission method will hereinafter be described in detail.

The same FFT size is applied to the PPDU that is based on the conventional 802.11n and 802.11ac. For example, in the 20 MHz transmission, 64 FFT is applied.

However, as described above, in the HE PPDU, different FFT sizes may be applied to the PPDU. For example, the HE PPDU may be divided into two (2) parts, and a FFT size that can be received by a legacy STA may be applied to a first part, and a FFT size that can be received by a HE STA may be applied to a second part. The first part may also be referred to as a legacy part, and the second part may also be referred to as a HE part. In the HE PPDU structure shown in FIG. 2 to FIG. 4, the second part may be positioned after the L-SIG, after the HE-STF, or after the HE-SIGA.

Figure 6:
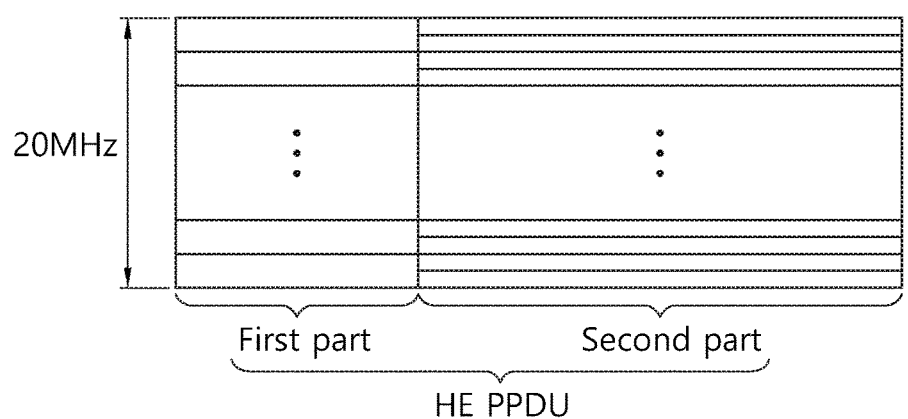
FIG. 6 illustrates an example of a HE PPDU having another FFT size applied thereto.

FIG. 6 illustrates an example of a HE PPDU having another FFT size applied thereto.

A FFT size having a size corresponding to an integer multiple of the size of the first part may be applied to the second part. For example, although 64 FFT is applied to the first part in the 20 MHz transmission, a FFT having a size that is 2 times larger (128 FFT) or 4 times larger (256 FFT) may be applied to the second part.

If the FFT size is increased (or expanded), the OFDM subcarrier spacing is reduced, thereby causing an increase in the number of OFDM subcarriers per unit frequency. When it is given that, in a 20 MHz transmission, 64 FFT is applied to the first part, and that 128 FFT is applied to the second part, the subcarrier spacing is equal to 312.5 kHz in the first part, and the subcarrier spacing is equal to 156.25 kHz in the second part. And, the CP size is increased from 0.8 us (micro second) to 1.6 us.

At this point, it may not be required to allocate a larger number of pilots that are inserted in the PPDU, wherein the larger number of pilots is increased with respect to the increased FFT size. This is because, although a FFT having an increased size is applied herein, the bandwidth that is used for channel estimation and tracking is the same for both the first part and the second part. Additionally, if the design is realized while maintaining the pilot allocation according to the conventional system as much as possible, the issue of complexity caused by the adoption of a new system may not act as a significant burden.

Hereinafter, pilot allocation to the second part in 20 MHz, 40 MHz, 80 MHz, and 160 MHz bandwidths will be proposed.

It will be assumed that the first part and the second part within the HE PPDU are transmitted by using the same bandwidth. According to an exemplary embodiment, the number of pilots of the second part may be equal to the number of pilots of the first part. According to an exemplary embodiment, a frequency position of the second part may be the same as a frequency position of the first part. Even though the frequency positions are the same, since the FFT sizes are different, the subcarrier indexes are also different from one another.

Hereinafter, a number of tones being allocated to a DC subcarrier and a number of unused (or reserved) tones for interference prevention (e.g., 3 tones on one side and 4 tones on the other side in the 20 MHz transmission) are merely exemplary, and, therefore, arbitrary values may be assigned herein.

Figure 7:
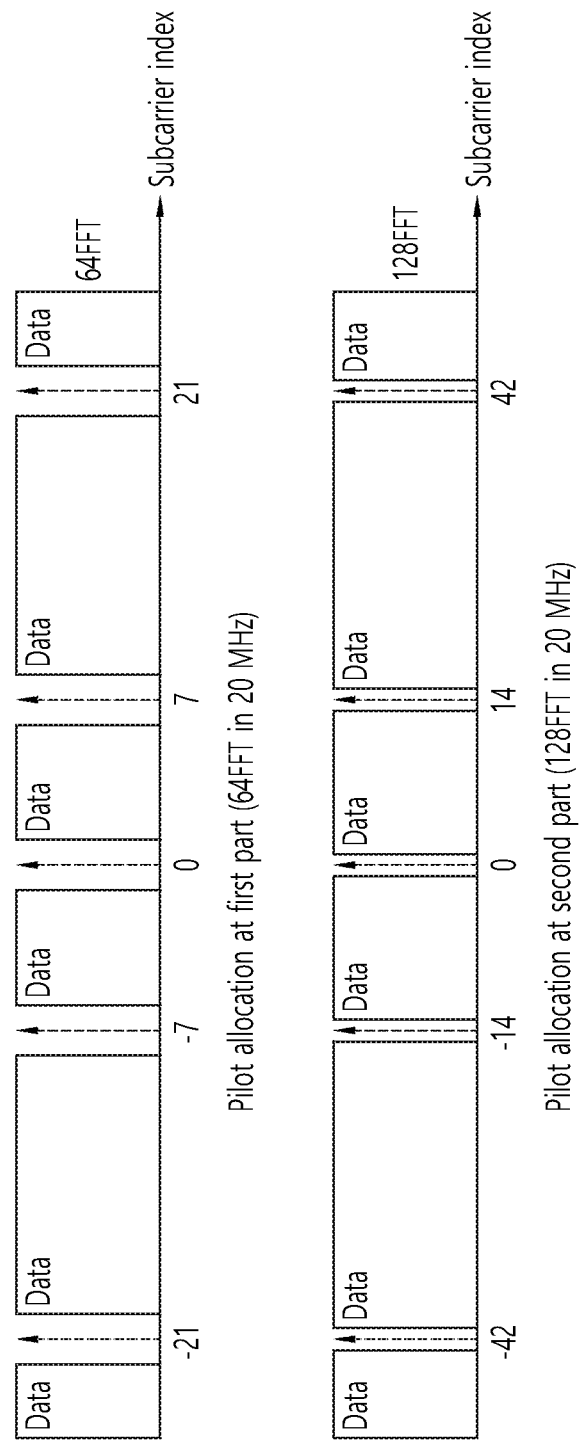
FIG. 7 illustrates a pilot allocation in a 20 MHz transmission according to an exemplary embodiment of the present invention.

FIG. 7 illustrates a pilot allocation in a 20 MHz transmission according to an exemplary embodiment of the present invention.

The pilot allocation of Equation 1 is used for the first part just as in the conventional 20 MHz transmission. Four (4) pilot tones may be inserted in the subcarrier index $k \in \{-21, -7, 7, 21\}$.

128 FFT is used for the second part, and the scaling factor corresponds to F=2. The number of pilot tones maintains the same number of 4 pilot tones (2 positive frequency indexes and 2 negative frequency indexes) used in 64 FFT. Therefore, the pilot subcarrier index of 128 FFT corresponds to: $F*\{\pm 7, \pm 21\} = \{\pm 14, \pm 42\}$.

Although the subcarrier spacing is changed, the frequency position that is to be used by the STA for channel estimation is maintained without modification. This is advantageous in that additional complexity is not caused when extracting the pilot subcarrier, and that, even if a new system is adopted, a maximum usage of the conventional implementation module may be realized.

Similarly, when it is given that 256 FFT is used for the second part, the scaling factor corresponds to F=4. Therefore, the pilot subcarrier index of 128 FFT corresponds to: $F*\{\pm 7, \pm 21\} = \{\pm 28, \pm 84\}$.

Figure 8:
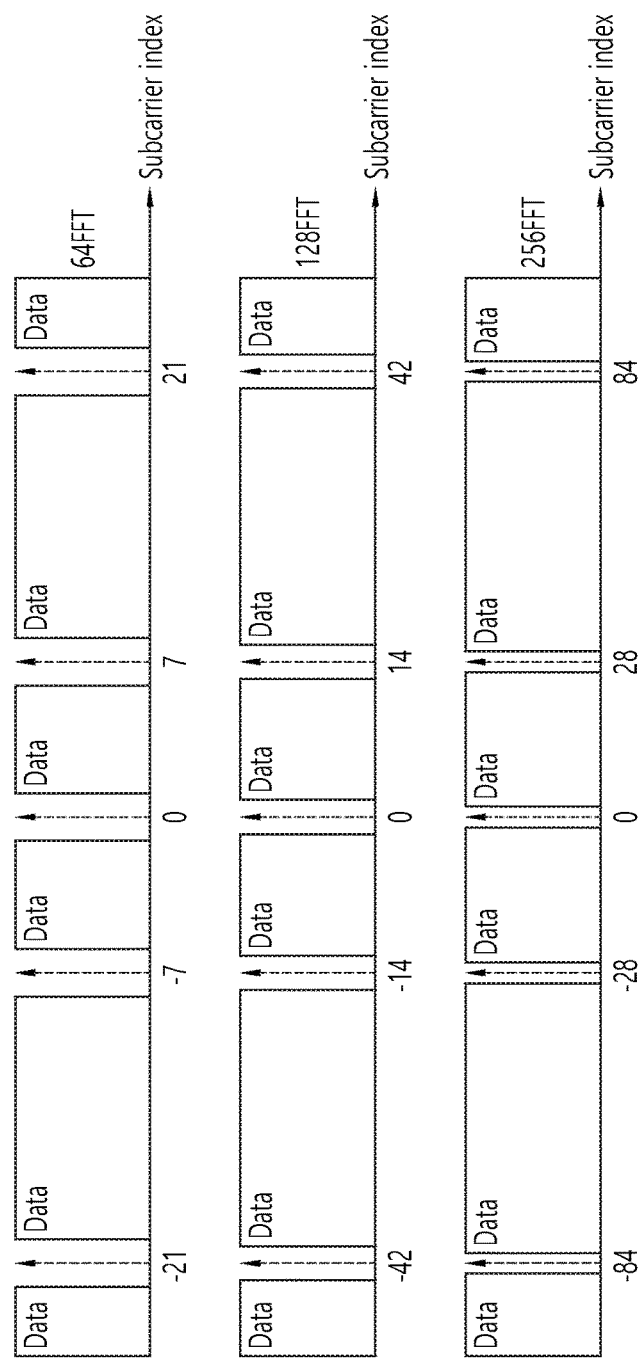
FIG. 8 shows that a pilot frequency position remains unchanged even if the FFT size varies in the 20 MHz transmission.

FIG. 8 shows that a pilot frequency position remains unchanged even if the FFT size varies in the 20 MHz transmission. Therefore, the positions where the STA tracks the channel are the same.

The scaling factors F=2 and 4 are merely exemplary, and F may be equal to an integer that is greater than 1.

The pilot sequence and pilot allocation in the 20 MHz transmission may be as described below.

<20 MHz Transmission with 128 FFT>

A pilot sequence respective to an $i_{STS}^{th}$ spatial stream and an $n^{th}$ symbol is as shown below.

$$P_{(i_{STS},n)}^{-58,58} = \{0, 0, 0, 0, 0, 0, 0, 0, 0, 0, 0, 0, 0, 0, 0, 0, \qquad \text{[Equation 5]}$$
$$\Psi_{i_{STS},n \oplus 4}^{(N_{STS})}, 0, 0, 0, 0, 0, 0, 0, 0, 0, 0, 0, 0, 0, 0, 0,$$
$$0, 0, 0, 0, 0, 0, 0, 0, 0, 0, 0, \Psi_{i_{STS},(n+1) \oplus 4}^{(N_{STS})}, 0, 0,$$
$$0, 0, 0, 0, 0, 0, 0, 0, 0, 0, 0, 0, 0, 0, 0, 0,$$
$$0, 0, 0, 0, 0, 0, \Psi_{i_{STS},(n+2) \oplus 4}^{(N_{STS})}, 0, 0, 0, 0, 0, 0, 0, 0, 0,$$
$$0, 0, 0, 0, 0, 0, 0, 0, 0, 0, 0, 0, 0, 0, 0, 0,$$
$$\Psi_{i_{STS},(n+3) \oplus 4}^{(N_{STS})}, 0, 0, 0, 0, 0, 0, 0, 0, 0, 0, 0, 0, 0, 0, 0\}$$

Herein, $N_{STS}$ represents a number of spatial streams, and the circled character '+' represents modulo arithmetic calculation.

When it is given that the pilot allocation per spatial stream is the same, $P_n^k$, which indicates pilot mapping of a $k^{th}$ subcarrier in an $n^{th}$ symbol, may be expressed by using the Equation shown below.

$$P_n^{\{-42, -14, 14, 42\}} = \{\Psi_{1, n \bmod 4}^{(1)}, \Psi_{1, (n+1) \bmod 4}^{(1)}, \Psi_{1, (n+2) \bmod 4}^{(1)}\}$$

$$P_n^{k \notin \{-42, -14, 14, 42\}} = 0 \quad \text{[Equation 6]}$$

Herein, the pilot parameter $\Psi^{(1)}_{1,m}$ may be defined as shown below in Table 2, just as in the conventional 20 MHz transmission.

<20 MHz Transmission with 256 FFT>

A pilot sequence respective to an $i_{STS}^{th}$ spatial stream and an $n^{th}$ symbol is as shown below.

$$P_{(iSTS,n)}^{-122,122} = \{0, 0, 0, 0, 0, 0, 0, 0, 0, 0, 0, 0, 0, 0, 0, 0, 0, 0, 0, \quad \text{[Equation 7]}$$
$$0, 0, 0, 0, 0, 0, 0, 0, 0, 0, 0, 0, 0, 0, 0, 0, 0, 0, 0, 0,$$
$$\Psi_{i_{STS}, n \oplus 4}^{(N_{STS})}, 0, 0, 0, 0, 0, 0, 0, 0, 0, 0, 0, 0, 0, 0, 0, 0,$$
$$0, 0, 0, 0, 0, 0, 0, 0, 0, 0, 0, 0, 0, 0, 0, 0, 0, 0, 0, 0,$$
$$0, 0, 0, 0, 0, 0, 0, 0, 0, 0, 0, 0, 0, 0, 0, 0, 0, 0, 0, 0,$$
$$\Psi_{i_{STS}, (n+1) \oplus 4}^{(N_{STS})}, 0, 0, 0, 0, 0, 0, 0, 0, 0, 0, 0, 0, 0, 0, 0,$$
$$0, 0, 0, 0, 0, 0, 0, 0, 0, 0, 0, 0, 0, 0, 0, 0, 0, 0, 0, 0,$$
$$0, 0, 0, 0, 0, 0, 0, 0, 0, 0, 0, 0, 0, 0, 0, 0, 0, 0, 0, 0,$$
$$\Psi_{i_{STS}, (n+2) \oplus 4}^{(N_{STS})}, 0, 0, 0, 0, 0, 0, 0, 0, 0, 0, 0, 0, 0, 0, 0,$$
$$0, 0, 0, 0, 0, 0, 0, 0, 0, 0, 0, 0, 0, 0, 0, 0, 0, 0, 0, 0,$$
$$0, 0, 0, 0, 0, 0, 0, 0, 0, 0, 0, 0, 0, 0, 0, 0, 0, 0, 0, 0,$$
$$\Psi_{i_{STS}, (n+3) \oplus 4}^{(N_{STS})}, 0, 0, 0, 0, 0, 0, 0, 0, 0, 0, 0, 0, 0, 0, 0,$$
$$0, 0, 0, 0, 0, 0, 0, 0, 0, 0, 0, 0, 0, 0, 0, 0, 0, 0, 0, 0\}$$

When it is given that the pilot allocation per spatial stream is the same, $P_n^k$, which indicates pilot mapping of a $k^{th}$ subcarrier in an $n^{th}$ symbol, may be expressed by using the Equation shown below.

$$P_n^{\{-84, -28, 28, 84\}} = \quad \text{[Equation 8]}$$
$$\{\Psi_{1, n \bmod 4}^{(1)}, \Psi_{1, (n+1) \bmod 4}^{(1)}, \Psi_{1, (n+2) \bmod 4}^{(1)}, \Psi_{1, (n+3) \bmod 4}^{(1)}\}$$

$$P_n^{k \notin \{-84, -28, 28, 84\}} = 0$$

Herein, the pilot parameter $\Psi^{(1)}_{1,m}$ may be defined as shown below in Table 2, just as in the conventional 20 MHz transmission.

Figure 9:
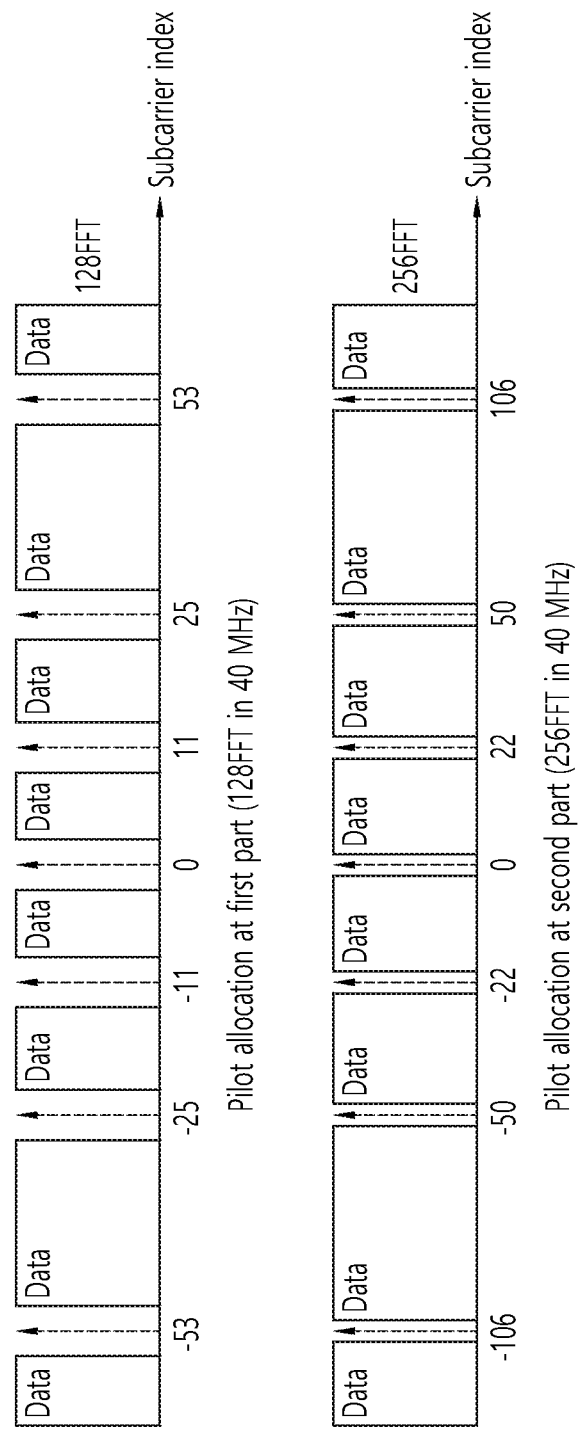
FIG. 9 illustrates a pilot allocation in a 40 MHz transmission according to another exemplary embodiment of the present invention.

FIG. 9 illustrates a pilot allocation in a 40 MHz transmission according to another exemplary embodiment of the present invention.

The pilot allocation of Equation 2 is used for the first part just as in the conventional 40 MHz transmission. Six (6) pilot tones may be inserted in the subcarrier index k∈{-53, -25, -11, 11, 25, 53}.

256 FFT is used for the second part, and the scaling factor corresponds to F=2. The number of pilot tones maintains the same number of 6 pilot tones (3 positive frequency indexes and 3 negative frequency indexes) used in 128 FFT. Therefore, the pilot subcarrier index of 256 FFT corresponds to: F*{±11, ±25, ±53}={±22, ±50, ±106}.

Similarly, when it is given that 512 FFT is used for the second part, the scaling factor corresponds to F=4. Therefore, the pilot subcarrier index of 512 FFT corresponds to: F*{±11, ±25, ±53}={±44, ±100, ±212}.

Figure 10:
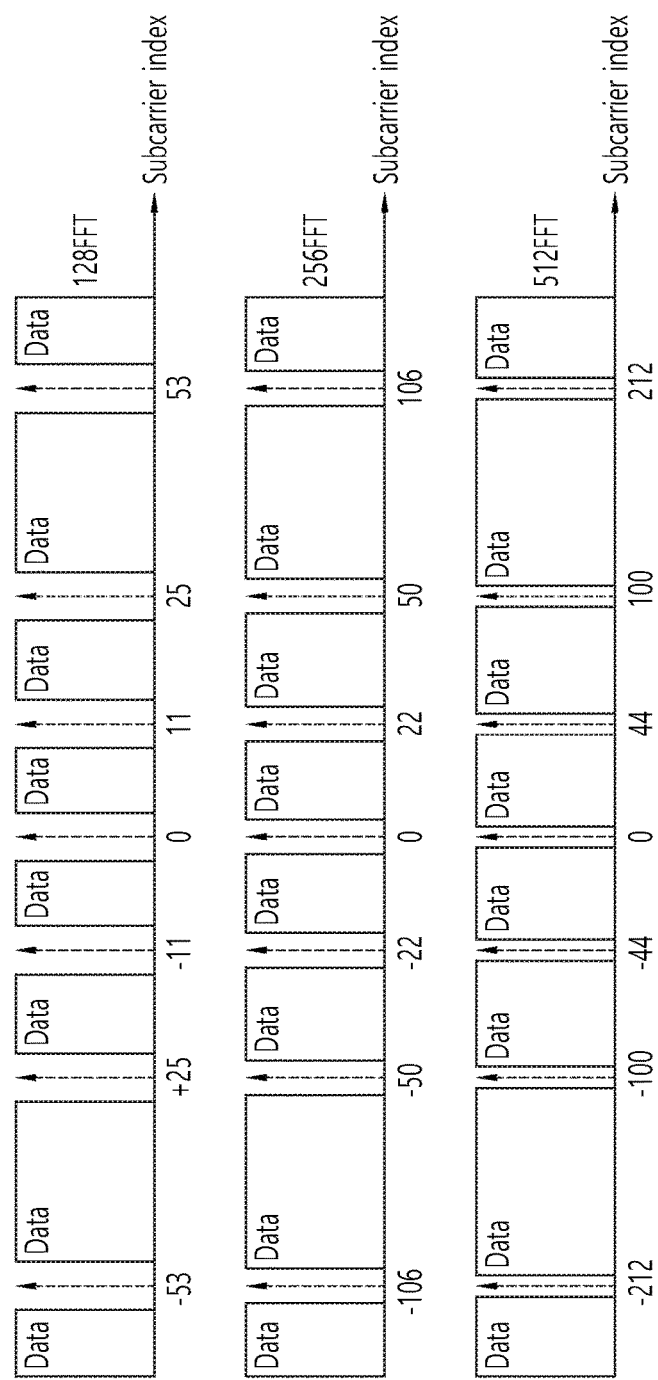
FIG. 10 shows that a pilot frequency position remains unchanged even if the FFT size varies in the 40 MHz transmission.

FIG. 10 shows that a pilot frequency position remains unchanged even if the FFT size varies in the 40 MHz transmission.

The pilot sequence and pilot allocation in the 40 MHz transmission may be as described below.

<40 MHz Transmission with 256 FFT>

A pilot sequence respective to an $i_{STS}^{th}$ spatial stream and an $n^{th}$ symbol is as shown below.

$$P_{(iSTS,n)}^{-122,122} = \quad \text{[Equation 9]}$$
$$\{0, 0, 0, 0, 0, 0, 0, 0, 0, 0, 0, 0, 0, 0, 0, 0, \Psi_{i_{STS}, n \oplus 6}^{(N_{STS})}, 0, 0,$$
$$0, 0, 0, 0, 0, 0, 0, 0, 0, 0, 0, 0, 0, 0, 0, 0, 0, 0, 0, 0,$$
$$0, 0, 0, 0, 0, 0, 0, 0, 0, 0, 0, 0, 0, 0, 0, 0, 0, 0, 0, 0,$$
$$0, 0, 0, 0, 0, 0, 0, 0, 0, 0, 0, \Psi_{i_{STS}, (n+1) \oplus 6}^{(N_{STS})}, 0, 0, 0, 0,$$
$$0, 0, 0, 0, 0, 0, 0, 0, 0, 0, 0, 0, 0, 0, 0, 0, 0, 0, 0, 0,$$
$$0, 0, \Psi_{i_{STS}, (n+2) \oplus 6}^{(N_{STS})}, 0, 0, 0, 0, 0, 0, 0, 0, 0, 0, 0, 0, 0,$$
$$0, 0, 0, 0, 0, 0, 0, 0, 0, 0, 0, 0, 0, 0, 0, 0, 0, 0, 0, 0,$$
$$0, 0, 0, 0, 0, 0, 0, 0, 0, \Psi_{i_{STS}, (n+3) \oplus 6}^{(N_{STS})}, 0, 0, 0, 0, 0, 0,$$
$$0, 0, 0, 0, 0, 0, 0, 0, 0, 0, 0, 0, 0, 0, 0, 0, 0, 0, 0, 0,$$
$$\Psi_{i_{STS}, (n+4) \oplus 6}^{(N_{STS})}, 0, 0, 0, 0, 0, 0, 0, 0, 0, 0, 0, 0, 0, 0, 0,$$
$$0, 0, 0, 0, 0, 0, 0, 0, 0, 0, 0, 0, 0, 0, 0, 0, 0, 0, 0, 0,$$
$$0, 0, 0, 0, 0, 0, 0, 0, 0, 0, 0, 0, 0, 0, 0, 0, 0, 0, 0, 0,$$
$$\Psi_{i_{STS}, (n+5) \oplus 6}^{(N_{STS})}, 0, 0, 0, 0, 0, 0, 0, 0, 0, 0, 0, 0, 0, 0, 0\}$$

Herein, $N_{STS}$ represents a number of spatial streams.

When it is given that the pilot allocation per spatial stream is the same, $P_n^k$, which indicates pilot mapping of a $k^{th}$ subcarrier in an $n^{th}$ symbol, may be expressed by using the Equation shown below.

$$P_n^{\{-106, -50, -22, 22, 50, 106\}} = \{\Psi_{1, (n+1) \bmod 6}^{(1)}, \ldots, \Psi_{1, (n+5) \bmod 6}^{(1)}\}$$

$$P_n^{k \notin \{-106, -50, -22, 22, 50, 106\}} = 0 \quad \text{[Equation 10]}$$

Herein, the pilot parameter $\Psi^{(1)}_{1,m}$ may be defined as shown below in Table 3, just as in the conventional 40 MHz transmission.

<40 MHz Transmission with 512 FFT>

A pilot sequence respective to an $i_{STS}^{th}$ spatial stream and an $n^{th}$ symbol is as shown below.

$$P_{(iSTS,n)}^{-250,250} = \{0, 0, 0, 0, 0, 0, 0, 0, 0, 0, 0, 0, 0, 0, 0, 0, 0, \quad \text{[Equation 11]}$$
$$0, 0, 0, 0, 0, 0, 0, 0, 0, 0, 0, 0, 0, 0, 0, 0, 0, 0, 0, 0,$$
$$\Psi_{i_{STS}, n \oplus 6}^{(N_{STS})}, 0, 0, 0, 0, 0, 0, 0, 0, 0, 0, 0, 0, 0, 0, 0, 0,$$
$$0, 0, 0, 0, 0, 0, 0, 0, 0, 0, 0, 0, 0, 0, 0, 0, 0, 0, 0, 0,$$
$$0, 0, 0, 0, 0, 0, 0, 0, 0, 0, 0, 0, 0, 0, 0, 0, 0, 0, 0, 0,$$
$$0, 0, 0, 0, 0, 0, 0, 0, 0, 0, 0, 0, 0, 0, 0, 0, 0, 0, 0, 0,$$
$$0, 0, 0, 0, 0, 0, 0, 0, 0, 0, 0, 0, 0, 0, 0, 0, 0, 0, 0, 0,$$
$$0, 0, 0, 0, 0, 0, 0, 0, 0, 0, 0, 0, 0, 0, 0, 0, 0, 0, 0, 0,$$
$$0, 0, 0, 0, 0, 0, 0, 0, 0, 0, 0, 0, 0, \Psi_{i_{STS}, (n+1) \oplus 6}^{(N_{STS})},$$
$$0, 0, 0, 0, 0, 0, 0, 0, 0, 0, 0, 0, 0, 0, 0, 0, 0, 0, 0, 0,$$

-continued 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, $\Psi_{i_{STS},(n+2)\oplus 6}^{(N_{STS})}$, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, $\Psi_{i_{STS},(n+3)\oplus 6}^{(N_{STS})}$, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, $\Psi_{i_{STS},(n+4)\oplus 6}^{(N_{STS})}$, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, $\Psi_{i_{STS},(n+5)\oplus 6}^{(N_{STS})}$, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0,}

When it is given that the pilot allocation per spatial stream is the same, $P_n^k$, which indicates pilot mapping of a $k^{th}$ subcarrier in an $n^{th}$ symbol, may be expressed by using the Equation shown below.

$$P_n^{\{-212,-100,-44,44,100,212\}} = \{\Psi_{1, n \bmod 6}^{(1)}, \Psi_{1, (n+1) \bmod 6}^{(1)}, \ldots, \Psi_{1, (n+5) \bmod 6}^{(1)}\}$$

$$P_n^{k \notin \{-212,-100,-44,44,100,212\}} = 0 \qquad [\text{Equation 12}]$$

Herein, the pilot parameter $\Psi_{l,m}^{(1)}$ may be defined as shown below in Table 3, just as in the conventional 40 MHz transmission.

Figure 11:
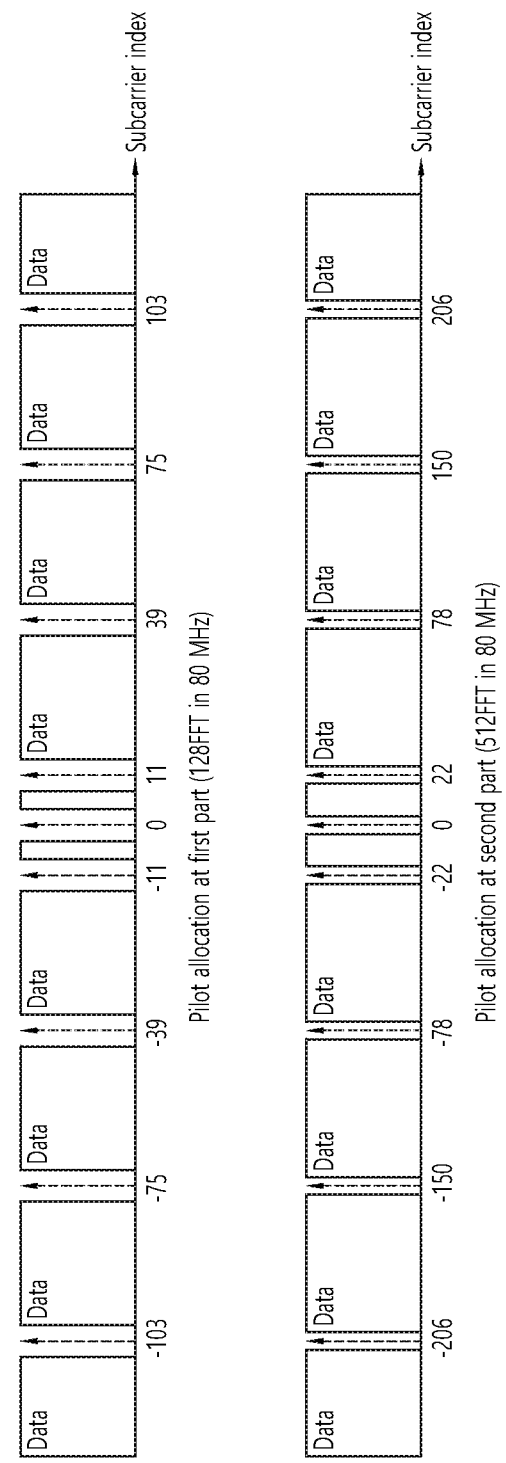
FIG. 11 illustrates a pilot allocation in an 80 MHz transmission according to yet another exemplary embodiment of the present invention.

FIG. 11 illustrates a pilot allocation in an 80 MHz transmission according to yet another exemplary embodiment of the present invention.

The pilot allocation of Equation 3 is used for the first part just as in the conventional 80 MHz transmission. Eight (8) pilot tones may be inserted in the subcarrier index k∈{−103, −75, −39, −11, 11, 39, 75, 103}.

512 FFT is used for the second part, and the scaling factor corresponds to F=2. The number of pilot tones maintains the same number of 8 pilot tones (4 positive frequency indexes and 4 negative frequency indexes) used in 256 FFT. Therefore, the pilot subcarrier index of 256 FFT corresponds to: F*{±11, ±39, ±75, ±103}={±22, ±78, ±150, ±206}.

Similarly, when it is given that 1024 FFT is used for the second part, the scaling factor corresponds to F=4. Therefore, the pilot subcarrier index of 1024 FFT corresponds to: F*{±11, ±39, ±75, ±103}={±44, ±156, ±300, ±412}.

Figure 12:
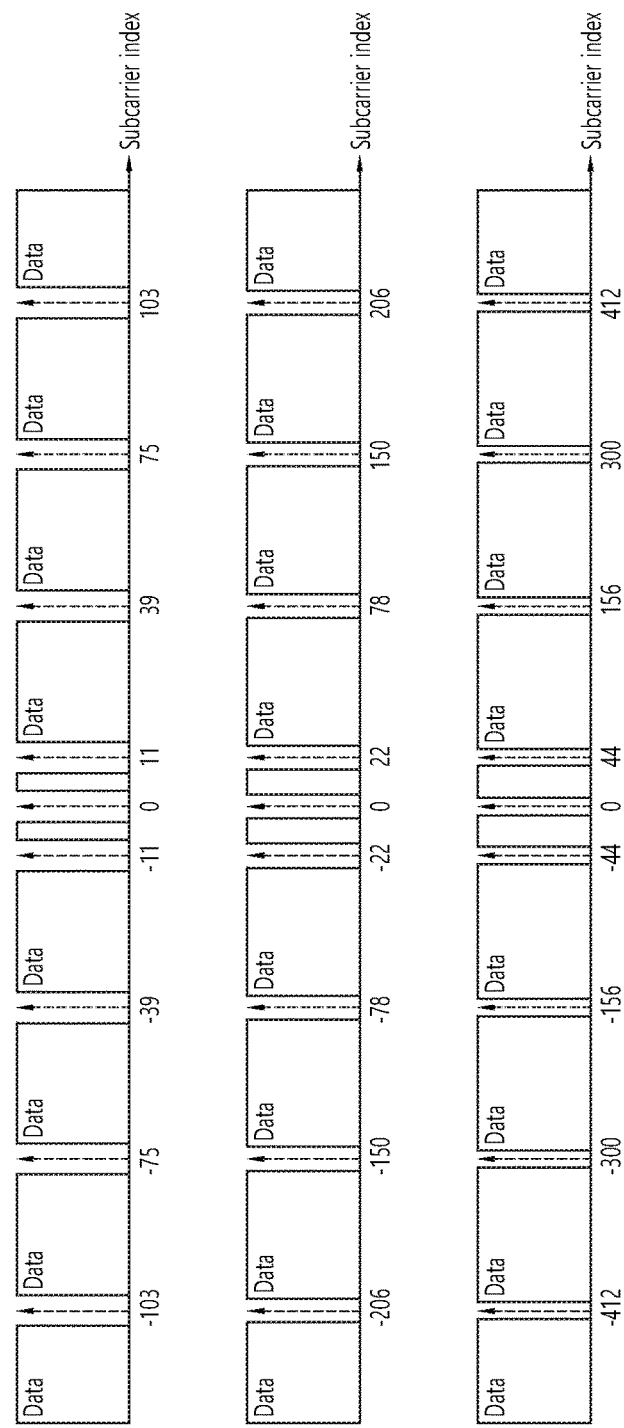
FIG. 12 shows that a pilot frequency position remains unchanged even if the FFT size varies in the 80 MHz transmission.

FIG. 12 shows that a pilot frequency position remains unchanged even if the FFT size varies in the 80 MHz transmission.

The pilot sequence and pilot allocation in the 80 MHz transmission may be as described below.

<80 MHz Transmission with 512 FFT>

$P_n^k$, which indicates pilot mapping of a $k^{th}$ subcarrier in an $n^{th}$ symbol, may be expressed by using the Equation shown below.

$$P_n^{\{-206,-150,-78,-22,22,78,150,206\}} = \{\Psi_{1, n \bmod 8}, \Psi_{1, (n+1) \bmod 8}, \ldots, \Psi_{1, (n+7) \bmod 8}\}$$

$$P_n^{k \notin \{-206,-150,-78,-22,22,78,150,206\}} = 0 \qquad [\text{Equation 13}]$$

Herein, the pilot parameter $\Psi_m$ may be defined as shown below in Table 4, just as in the conventional 80 MHz transmission.

<80 MHz Transmission with 1024 FFT>

$P_n^k$, which indicates pilot mapping of a $k^{th}$ subcarrier in an $n^{th}$ symbol, may be expressed by using the Equation shown below.

$$P_n^{\{-412,-300,-156,-44,44,156,300,412\}} = \{\Psi_{1, n \bmod 8}, \Psi_{1, (n+1) \bmod 8}, \ldots, \Psi_{1, (n+7) \bmod 9}\}$$

$$P_n^{k \notin \{-412,-300,-156,-44,44,156,300,412\}} = 0 \qquad [\text{Equation 14}]$$

Herein, the pilot parameter $\Psi_m$ may be defined as shown below in Table 4, just as in the conventional 80 MHz transmission.

Meanwhile, in a 160 MHz transmission, 512 FFT is applied to the first part. For the 160 MHz transmission, the 80 MHz pilot mapping is duplicated to two (20) 80 MHz sub-channels for the 160 MHz transmission. Sixteen (16) pilot tones may be inserted in subcarrier indexes k∈{−231, −203, −167, −139, −117, −89, −53, −25, 25, 53, 89, 117, 139, 167, 203, 231}.

When 1024 FFT is used for the second part, the scaling factor corresponds to F=2. Therefore, the pilot subcarrier index of 1024 FFT corresponds to: F*{±25, ±53, ±89, ±117, ±139, ±167, ±203, ±231}={±50, ±106, ±178, ±234, ±278, ±334, ±406, ±462}.

Similarly, when it is given that 2048 FFT is used for the second part, the scaling factor corresponds to F=4. Therefore, the pilot subcarrier index of 512 FFT corresponds to: F*{±25, ±53, ±89, ±117, ±139, ±167, ±203, ±231}={±100, ±212, ±356, ±468, ±556, ±668, ±812, ±924}.

The pilot sequence and pilot allocation in the 160 MHz transmission may be as described below.

<160 MHz Transmission with 1024 FFT>

$P_n^k$, which indicates pilot mapping of a $k^{th}$ subcarrier in an $n^{th}$ symbol, may be expressed by using the Equation shown below.

$$P_n^{\{-462,-406,-344,-278,-234,-178,-106,-50,50,106,178,234,278,334,406,462\}} \qquad [\text{Equation 15}]$$
$$= \{\Psi_{n \bmod 8}, \Psi_{(n+1) \bmod 8}, \Psi_{(n+2) \bmod 8}, \Psi_{(n+3) \bmod 8},$$
$$\Psi_{(n+4) \bmod 8}, \Psi_{(n+5) \bmod 8}, \Psi_{(n+6) \bmod 8}, \Psi_{(n+7) \bmod 8},$$
$$\Psi_{n \bmod 8}, \Psi_{(n+1) \bmod 8}, \Psi_{(n+2) \bmod 8}, \Psi_{(n+3) \bmod 8},$$
$$\Psi_{(n+4) \bmod 8}, \Psi_{(n+5) \bmod 8}, \Psi_{(n+6) \bmod 8}, \Psi_{(n+7) \bmod 8}\}$$
$$P_n^{k \notin \{-462,-406,-344,-278,-234,-178,-106,-50,50,106,178,234,278,334,406,462\}}$$
$$= 0$$

Herein, the pilot parameter $\Psi_m$ may be defined as shown below in Table 4.

<160 MHz Transmission with 2048 FFT>

$P_n^k$, which indicates pilot mapping of a $k^{th}$ subcarrier in an $n^{th}$ symbol, may be expressed by using the Equation shown below.

$$P_n^{\{-924,-812,-668,-556,-468,-356,-212,-100,100,212,356,468,556,668,812,924\}} \text{ [Equation 16]}$$

$$= \{\Psi_{n \bmod 8}, \Psi_{(n+1) \bmod 8}, \Psi_{(n+2) \bmod 8}, \Psi_{(n+3) \bmod 8},$$

$$\Psi_{(n+4) \bmod 8}, \Psi_{(n+5) \bmod 8}, \Psi_{(n+6) \bmod 8}, \Psi_{(n+7) \bmod 8},$$

$$\Psi_{n \bmod 8}, \Psi_{(n+1) \bmod 8}, \Psi_{(n+2) \bmod 8}, \Psi_{(n+3) \bmod 8},$$

$$\Psi_{(n+4) \bmod 8}, \Psi_{(n+5) \bmod 8}, \Psi_{(n+6) \bmod 8}, \Psi_{(n+7) \bmod 8}\}$$

$$P_n^{k \notin \{-924,-812,-668,-556,-468,-356,-212,-100,100,212,356,468,556,668,812,924\}}$$

$$= 0$$

Herein, the pilot parameter $\Psi_m$ may be defined as shown below in Table 4.

Figure 13:
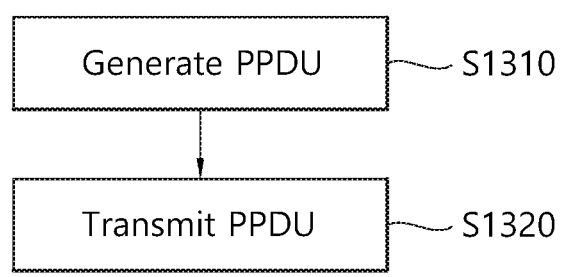
FIG. 13 illustrates a method for transmitting a PPDU according to an exemplary embodiment of the present invention.

FIG. 13 illustrates a method for transmitting a PPDU according to an exemplary embodiment of the present invention. This method may be performed by a transmitter (STA or AP).

In step S1310, the transmitter generates a PPDU. And, in step S1320, the transmitter transmits the PPDU to a receiver in the transmission bandwidth. The transmission bandwidth may correspond to an integer multiple of 20 MHz.

Although the PPDU may correspond to any one of the PPDU formats of FIG. 2 to FIG. 4, the present invention will not be limited only to this. The PPDU may include a first part to which a first FFT size is applied and a second part to which a second FFT size is applied.

The number of pilots of the second part may be equal to the number of pilots of the first part. A frequency position of the second part may be the same as a frequency position of the first part.

When the transmission bandwidth corresponds to 20 MHz, 40 MHz, 80 MHz, or 160 MHz, the pilot allocation in the first part and the second part may be carried out in accordance with the exemplary embodiments shown in FIG. 7 to FIG. 12.

Figure 14:
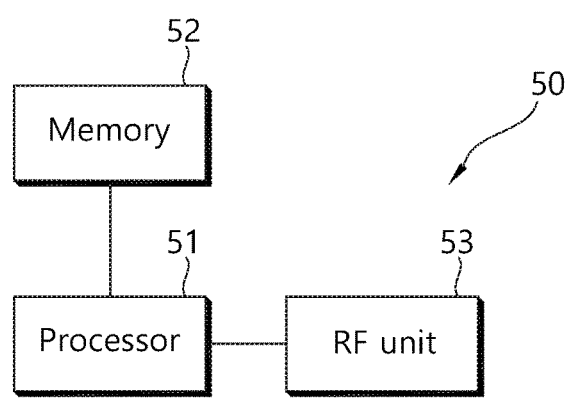
FIG. 14 illustrates a block diagram showing a wireless communication system in which the disclosure of this specification is implemented.

FIG. 14 illustrates a block diagram showing a wireless communication system in which the disclosure of this specification is implemented.

A wireless device 50 may include a STA in the above-described exemplary embodiment. The wireless device 50 may include a transmitter in the exemplary embodiment of FIG. 13.

The wireless device 50 includes a processor 51, a memory 52, and a RF unit (radio frequency unit) 53. In the above-described exemplary embodiment, the wireless device may correspond to an AP or a non-AP STA. The RF unit 53 is connected to the processor 51, thereby being capable of transmitting and/or receiving radio signals. The processor 51 realizes the proposed function, process, and/or method. In the above-described exemplary embodiment, the operations of the STA or transmitter may be realized by the processor 51. The memory 52 is connected to the processor 51, thereby being capable of storing the instructions that realize the operations of the processor 51.

The processor may include an ASIC (application-specific integrated circuit), another chip set, a logical circuit, and/or a data processing device. The memory may include a ROM (read-only memory), a RAM (random access memory), a flash memory, a memory card, a storage medium, and/or another storage device. The RF unit may include a baseband circuit for processing the radio signals. When the exemplary embodiment is implemented as software, the above-described method may be implemented as a module (process, function, and so on) performing the above-described functions. The module may be stored in the memory and may be executed by the processor. The memory may be located inside or outside of the processor and may be connected to the processor through a diversity of well-known means.

In the exemplary system that is described above, although the methods are described based on a flow chart according to a series of steps or blocks, the present invention will not be limited only to the order of the process steps described herein, and, therefore, a particular step may be performed in an order that is different from the above-described order or may be performed simultaneously with another process step. Furthermore, it will be apparent to any one skilled in the art that the process steps mentioned in the flow chart presented herein are not exclusive, and that one or more of the process steps mentioned in the flow chart presented herein may be deleted without influencing or departing from the scope and spirit of the present invention.

What is claimed is:

1. A method for transmitting a frame in a wireless Local Area Network (LAN), the method performed by a transmitter and comprising:
    generating a Physical layer Protocol Data Unit (PPDU) for a transmission bandwidth; and
    transmitting the PPDU via the generated transmission bandwidth to a receiver,
    wherein the PPDU includes a first portion and a second portion following the first portion,
    wherein the first portion includes a legacy-short training field (L-STF), a legacy-long training field (L-LTF), and a legacy-signal field (L-SIG),
    wherein the second portion includes a high efficiency-SIG A (HE-SIG A), a high efficiency-SIG B (HE-SIG B), a high efficiency-STF (HE-STF), a high efficiency-LTF (HE-LTF), and a data field,
    wherein the first portion is generated based on a first FFT (fast Fourier transform) size and a first spacing between first subcarriers,
    wherein the second portion is generated based on a second FFT size and a second spacing between second subcarriers,
    wherein first pilots are preset among the first subcarriers and second pilots are preset among the second subcarriers,
    wherein the second FFT size is greater than the first FFT size,
    wherein the second subcarrier spacing is smaller than the first subcarrier spacing,
    wherein the number of second pilots is equal to the number of first pilots, and
    wherein second frequency positions of the second pilots is the same as first frequency positions of the first pilots.

2. The method of claim 1, wherein the second FFT size is an integer multiple of the first FFT size.

3. The method of claim 2, wherein the second FFT size is 2 times or 4 times the first FFT size.

4. The method of claim 2, wherein a pilot subcarrier index of the second portion is incremented as much as an integer multiple by which the second FFT size increases.

5. The method of claim 2, wherein the second FFT size is 256 and the number of first pilots is 4 when the transmission bandwidth is 20 MHz.

6. The method of claim 2, wherein the second FFT size is 512 and the number of first pilots is 6 when the transmission bandwidth is 20 MHz.

7. The method of claim 2, wherein the second FFT size is 1024 and the number of first pilots is 8 when the transmission bandwidth is 80 MHz.

8. The method of claim 2, wherein the second FFT size is 2048 and the number of first pilots is 16 when the transmission bandwidth is 160 MHz.

9. A device for a wireless Local Area Network (LAN), the device comprising:
- a Radio Frequency (RF) unit configured to transmit and receive radio signals; and
- a processor connected to the RF unit, the processor configured to:
  generate a Physical layer Protocol Data Unit (PPDU) for a transmission bandwidth, and
  control the RF unit to transmit the PPDU via the generated transmission bandwidth to a receiver,
  wherein the PPDU includes a first portion and a second portion following the first portion,
  wherein the first portion includes a legacy-short training field (L-STF), a legacy-long training field (L-LTF), and a legacy-signal field (L-SIG),
  wherein the second portion includes a high efficiency-SIG A (HE-SIG A), a high efficiency-SIG B (HE-SIG B), a high efficiency-STF (HE-STF), a high efficiency-LTF (HE-LTF), and a data field,
  wherein the first portion is generated based on a first FFT (fast Fourier transform) size and a first spacing between first subcarriers,
  wherein the second portion is generated based on a second FFT size and a second spacing between second subcarriers,
  wherein first pilots are preset among the first subcarriers and second pilots are preset among the second subcarriers,
  wherein the second FFT size is greater than the first FFT size,
  wherein the second subcarrier spacing is smaller than the first subcarrier spacing,
  wherein the number of second pilots is equal to the number of first pilots, and
  wherein second frequency positions of the second pilots is the same as a-first frequency positions of the first pilots.

10. The device of claim 9, wherein the second FFT size is an integer multiple of the first FFT size.

11. The device of claim 10, wherein the second FFT size is 2 times or 4 times the first FFT size.

12. The device of claim 10, wherein a pilot subcarrier index of the second portion is incremented as much as an integer multiple.

13. The device of claim 10, wherein the second FFT size is 256 and the number of first pilots is 4 when the transmission bandwidth is 20 MHz.

14. The device of claim 10, wherein the second FFT size is 512 and the number of first pilots portion is 6 when the transmission bandwidth is 20 MHz.

15. The device of claim 10, wherein the second FFT size is 1024 and the number of first pilots is 8 when the transmission bandwidth is 80 MHz.

16. The device of claim 10, wherein the second FFT size is 2048 and the number of first pilots is 16 when the transmission bandwidth is 160 MHz.

* * * * *